United States Patent
Goslin et al.

(10) Patent No.: US 9,981,182 B2
(45) Date of Patent: May 29, 2018

(54) SYSTEMS AND METHODS FOR PROVIDING IMMERSIVE GAME FEEDBACK USING HAPTIC EFFECTS

(71) Applicant: Disney Enterprises, Inc., Burbank, CA (US)

(72) Inventors: Michael P. Goslin, Sherman Oaks, CA (US); Eric C. Haseltine, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 281 days.

(21) Appl. No.: 15/043,264

(22) Filed: Feb. 12, 2016

(65) Prior Publication Data

US 2017/0232338 A1    Aug. 17, 2017

(51) Int. Cl.
| | | |
|---|---|---|
| A63F 13/285 | (2014.01) | |
| G06F 3/01 | (2006.01) | |
| G06F 1/16 | (2006.01) | |
| G06T 19/00 | (2011.01) | |
| A63F 13/28 | (2014.01) | |
| A63F 13/92 | (2014.01) | |
| A63F 13/327 | (2014.01) | |
| A63F 13/32 | (2014.01) | |
| A63F 13/332 | (2014.01) | |

(52) U.S. Cl.
CPC .......... *A63F 13/285* (2014.09); *A63F 13/28* (2014.09); *A63F 13/32* (2014.09); *A63F 13/327* (2014.09); *A63F 13/332* (2014.09); *A63F 13/92* (2014.09); *G06F 1/163* (2013.01); *G06F 3/016* (2013.01); *G06T 19/006* (2013.01); *A63F 2300/206* (2013.01); *A63F 2300/8082* (2013.01)

(58) Field of Classification Search
USPC .......................................................... 463/31
See application file for complete search history.

(56) References Cited

U.S. PATENT DOCUMENTS

| | | |
|---|---|---|
| 5,490,784 A | 2/1996 | Carmein |
| 5,913,727 A | 6/1999 | Ahdoot |
| 7,967,679 B2 | 6/2011 | Ombrellaro |

(Continued)

FOREIGN PATENT DOCUMENTS

WO    WO 2015/100482    7/2015

OTHER PUBLICATIONS

"SemFeel: A User Interface with Semantic Tactile Feedback for Mobile Touch-screen Devices" by: Yatani et al., Oct. 2009, pp. 1-10.

(Continued)

*Primary Examiner* — Pierre E Elisca
(74) *Attorney, Agent, or Firm* — Farjami & Farjami LLP

(57) ABSTRACT

There is provided a system including a wearable feedback device having a first feedback element and a second feedback element, a non-transitory memory storing a game and an executable code, and a hardware processor executing the executable code to receive an input signal from the game, transmit a first activation signal to activate the first feedback element to provide a first feedback including a haptic effect, in response to receiving the input signal, and transmit a second activation signal to activate the second feedback element to provide a second feedback, in response to receiving the input signal.

20 Claims, 4 Drawing Sheets

(56) References Cited

U.S. PATENT DOCUMENTS

| | | |
|---|---|---|
| 8,328,638 B2 | 12/2012 | Thorner |
| 8,475,172 B2 | 7/2013 | Lieberman |
| 8,680,975 B2 | 3/2014 | Henderson |
| 8,797,152 B2 | 8/2014 | Henderson |
| 2007/0091063 A1 | 4/2007 | Nakamura |
| 2009/0024065 A1* | 1/2009 | Einarsson .......... A41D 13/1281 602/26 |
| 2012/0028721 A1 | 2/2012 | Johnson |
| 2012/0156661 A1 | 7/2012 | Smith |
| 2013/0198625 A1 | 8/2013 | Anderson |
| 2014/0056461 A1 | 2/2014 | Afshar |
| 2014/0194781 A1* | 7/2014 | Einarsson .......... A41D 13/1281 600/587 |
| 2015/0070146 A1 | 3/2015 | Cruz-Hernandez |
| 2015/0077234 A1 | 3/2015 | Fullam |
| 2015/0097719 A1 | 4/2015 | Balachandreswaran |
| 2015/0105129 A1 | 4/2015 | Chapman |
| 2015/0123774 A1 | 5/2015 | Ioffreda |
| 2015/0130706 A1 | 5/2015 | Lacroix |
| 2016/0166930 A1* | 6/2016 | Brav ....................... F41A 33/00 463/30 |

OTHER PUBLICATIONS

"Analysis of tactors for wearable simulator feedback: a tactile vest architecture" by: Prater et al., Mar. 2013, pp. 1-2.
"Blind Laser Game: Action in the Dark" by: Grisel et al., 2012, pp. 1-4.

\* cited by examiner

SYSTEMS AND METHODS FOR PROVIDING IMMERSIVE GAME FEEDBACK USING HAPTIC EFFECTS

BACKGROUND

Video games conventionally show a sequence of events occurring in the game as the user controls a character navigating the game, and are generally played on a television or a game console connected to a television. Recent advances in display technology and game consoles have allowed the creation of more realistic looking games, including graphics that mimic real life. Additionally, recent advances in audio technology allow the creation of more immersive audio. However, even with current advances in display and audio technology, game users may still mostly feet as if they are merely observers, and not part of the events occurring in the game.

SUMMARY

The present disclosure is directed to systems and methods for providing immersive game feedback using haptic effects, substantially as shown in and/or described in connection with at least one of the figures, as set forth more completely in the claims.

DETAILED DESCRIPTION

Figure 1:
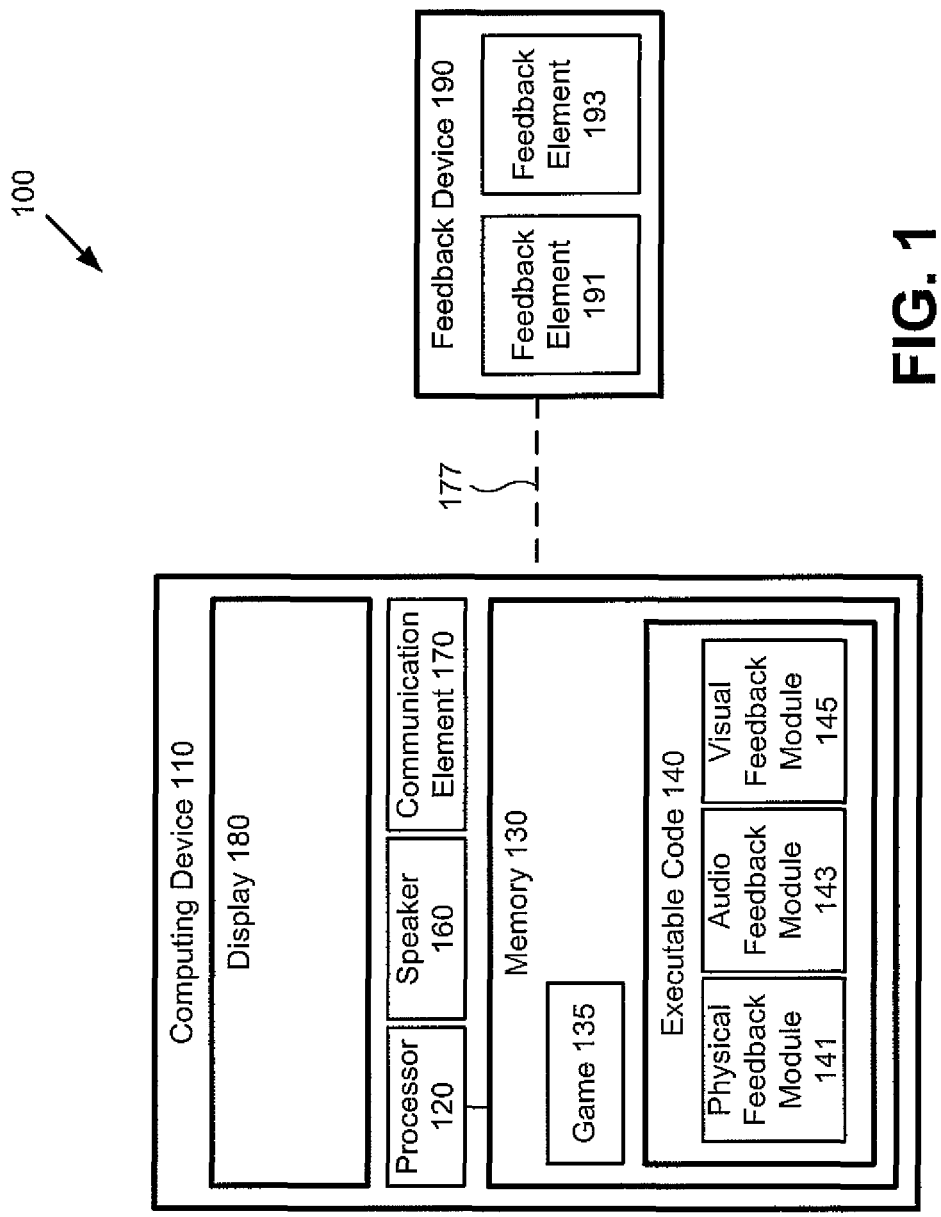
FIG. 1 shows a diagram of an exemplary system for providing immersive feedback using haptic effects, including a computing device and a feedback device, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of exemplary system 100 for providing immersive game feedback using haptic effects, according to one implementation of the present disclosure. System 100 includes computing device 110 and feedback device 190. Computing device 110 includes processor 120, memory 130, speaker 160, communication element 170, and display 180. Processor 120 is a hardware processor, such as a central processing unit (CPU) used in computing devices. Memory 130 is a non-transitory storage device for storing computer code for execution by processor 120, and also storing various data and parameters. Memory 130 includes game 135 and executable code 140. Computing device 110 may be a game system, a computer, a laptop computer, etc. In some implementations, computing device 110 may include feedback device 190, or feedback device 190 may be connected to computing device 110 via connection 177. Connection 177 may be a wired connection or a wireless connection.

Game 135 may be an interactive game, such as an application software or app running on a mobile device, e.g., a mobile phone or a tablet computer, a game for a game console, a game for a home computer, a game for an augmented reality system, a game for a virtual reality system, etc. Game 135 may be a real-time play environment game, such as a video game, an augmented reality game, a virtual reality game, etc. In some implementations, game 135 may be a game in which the user battles virtual enemies. Game 135 may include a game played by one or more users in the same location, or a game played by two or more users at more than one location, such as a massive multiplayer online game. Virtual enemies in game 135 may be virtual representations of other users playing game 135, or may be characters controlled by other users playing game 135, either at the same location as the user or at one or more other locations. In some implementations, the user may control a character in game 135, or game 135 may be a first-person game so the user is the character in game 135.

Executable code 140 includes one or more software modules stored in memory 130 for execution by processor 120 of commuting device 110. As shown in FIG. 1, executable code 140 includes physical feedback module 141, audio feedback module 143, and visual feedback module 145. Physical feedback module 141 is a software module for execution by processor 120 to activate one or more haptic feedback elements, providing physical feedback related to an event in game 135. Physical feedback module 141 may send a signal to activate a haptic feedback element to provide physical feedback, so the user playing game 135 may experience what is happening to a character in game 135 controlled by the user. Physical feedback module 141 may also send a signal to activate one or more haptic feedback elements to enhance what is taking place in game 135, for example, by providing physical feedback related to a character in game 135 walking up the stairs or running through an environment in game 135.

Audio feedback module 143 is a software module for execution by processor 120 to play an audio, providing audio feedback related to an event in game 135. Audio feedback module may provide audio feedback that includes sounds from game 135, such as music, voices of characters speaking, sound effects, etc. In some implementations, audio feedback module 143 may provide audio feedback including a frequency shift, such as an audio feedback including one or more sounds having an increasing or decreasing frequency. In some implementations, an audio feedback having a changing frequency may be used for a moving object in game 135, such as a Doppler shift created by a moving object. In other implementations, low frequency audio feedback may be used to create a physical feedback, such as a shake associated with an earthquake or an explosion.

Visual feedback module 145 is a software module for execution by processor 120 to play video content providing visual feedback related to an event in game 135. Visual feedback module may display a video content on display 180, such as displaying an event occurring in game 135. In some implementations, visual feedback module 145 may provide visual feedback to create the sensation of motion associated with an event in game 135. Visual feedback may be a display of events occurring in game 135, and may be presented in a three-dimensional (3D) video, presented using an augmented reality display.

Communication element 170 may be a communication element for connecting computing device 110 to one or more other devices. In some implementations, communication element 170 may be a wire communication port, such as a universal serial bus (USB) port, Firewire port, Ethernet cable port, telephone cable port, HDMI port, game control port, etc. In some implementations, communications element 170 may be configured to receive a transferable memory device, such as an SD card, mini SD card, micro SD card, USB memory device (thumb drive), a memory stick, game cartridge or disc, or other configurations of transferable memory known in the art. In other implementations, communication element 170 may enable wireless communications, such that computing device 110 may be wirelessly connected to a computer, a computer network, an input device, such as a game controller, and/or feedback device 190 using WiFi, cellular, Bluetooth®, Bluetooth® Low Energy (BLE), or other wireless technologies.

Feedback device 190 may be a wearable device for providing feedback to a user. Feedback device 190 may be an article of clothing, such as a vest, or an accessory, such as an armband, necklace, etc. In some implementations, feedback device 190 may include a plurality of feedback elements, including feedback element 191 and feedback element 193. Feedback elements 191 and 193 may be integrated in feedback device 190, such as integrating a physical, audio, or visual feedback element in feedback device 190 during manufacturing. In other implementations, feedback elements 191 and 193 may be elements that are attached to feedback device 190, such as a mobile phone that is connected to an armband or other wearable device. Elements of a mobile phone that may be used as feedback elements include speakers of the mobile phone, the display of the mobile phone, a motor or haptic actuator of the mobile phone that causes vibration, etc.

In some implementations, feedback element 191 may include a haptic actuator for providing a physical feedback. The haptic actuator may provide feedback to the user through touch, such as vibration, motion, etc. Feedback element 191 may include a motor for creating a vibration, one or more linear actuators for tapping, a speaker for generating physical feedback, such as by using low frequency sound to create a feeling of impact, etc. In some implementations, feedback element 191 may be used to provide the user with feedback to make the user experience what is happening to a character in game 135 controlled by the user. For example, feedback element 191 may be used to provide physical feedback, so the user feels the shaking effect of an explosion that occurs near the user's character in game 135. As another example, feedback element 191 may be used to provide physical feedback so the user feels an impact when the character controlled by the user is shot in game 135. Feedback element 191 may also provide physical feedback to enhance events in game 135, such as providing physical feedback that enhances a character walking in game 135 by coordinating the physical feedback with the steps of the character.

Feedback element 193 may include a haptic actuator, a speaker, a display, or other device for providing feedback to the user. Feedback element 193 may also be a haptic actuator, a speaker, a display, etc. In some implementations, executable code 140 may activate feedback element 193 to provide a physical feedback, an audio feedback, or a visual feedback to the user. Feedback element 193 may be used to provide a feedback that is coordinated with the feedback provided by feedback element 191. For example, feedback element 193 may provide an audio feedback in coordination with physical feedback, so that a sound of a nearby explosion or shot provided by feedback element 193 coordinates with a vibration generation by feedback element 191.

Figure 2:
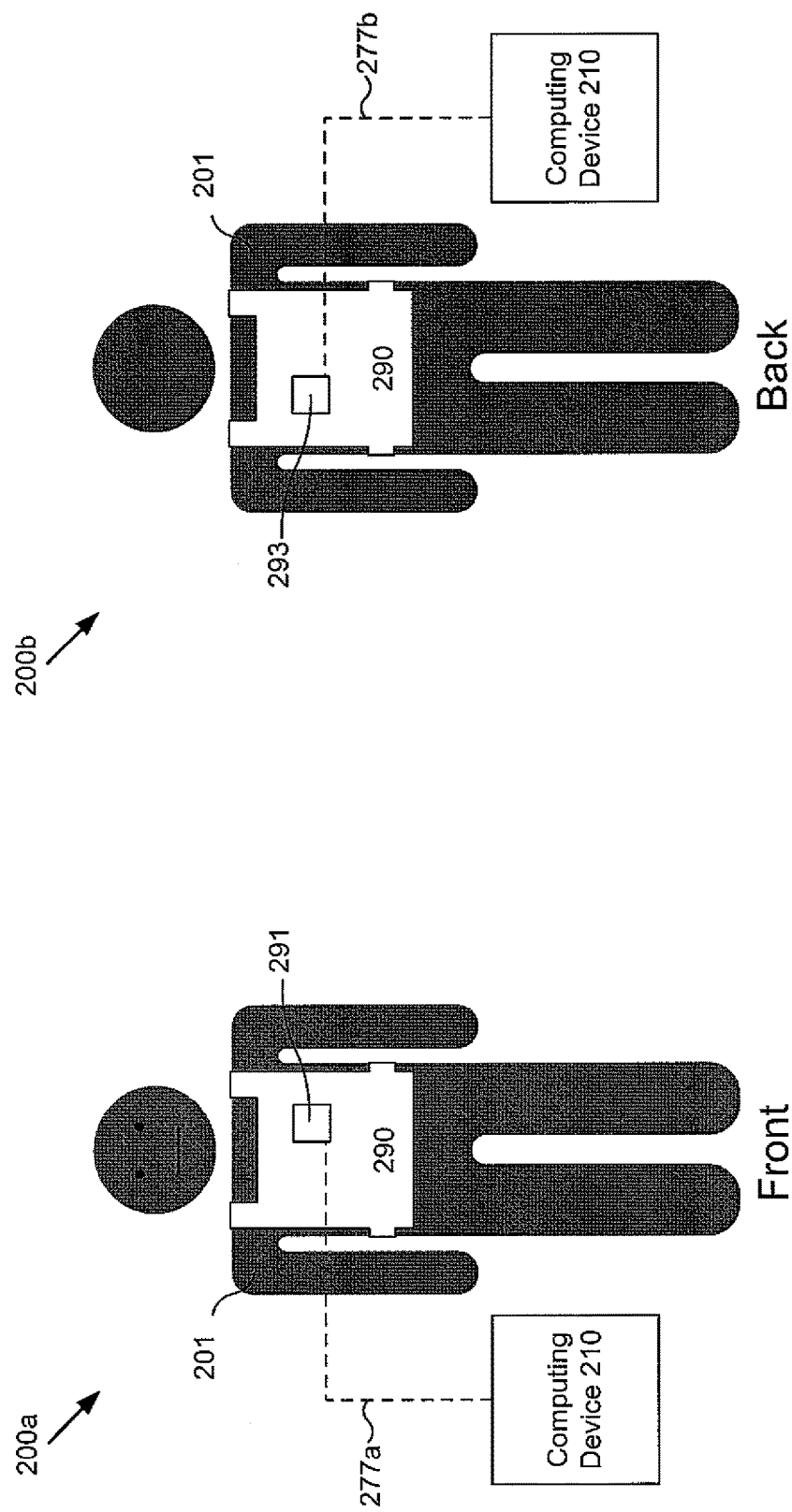
FIG. 2a shows a diagram of a front' view of a user wearing an exemplary feedback device, according to one implementation of the present disclosure.
FIG. 2b shows a diagram of a rear view of the user of FIG. 2a wearing the feedback device, according to one implementation of the present disclosure.

FIG. 2a shows a diagram of a front view of a user wearing an exemplary feedback device, according to one implementation of the present disclosure. Diagram 200a shows user 201 wearing feedback vest 290, which is connected to computing device 210 via connection 277a, and includes feedback element 291. Connection 277a may be a wired connection, or may be a wireless connection. Feedback element 291 may be a haptic actuator for providing user 201 with physical feedback related to game 135, such as notifying user 201 of the occurrence of an event in game 135. For example, game 135 may be a first-person shooter game, and during game play, a virtual enemy in game 135 may shoot the character controlled by user 201. As a result of the character being shot, physical feedback module 141 may send a signal to activate feedback element 291. Activation of feedback element 291 may provide the front side of user 201 with physical feedback by vibrating, tapping user 201 one or more times indicating the shot, or otherwise providing physical feedback to user 201.

FIG. 2b shows a diagram of a rear view of the user of FIG. 2a, according to one implementation of the present disclosure. Diagram 200b shows user 200a wearing feedback vest 290. Diagram 200b shows user 201 wearing feedback vest 290b, which is connected to computing device 210 via connection 277b, and includes feedback element 293. Connection 277b may be a wired connection, or a wireless connection. Feedback element 293 may be a haptic actuator for providing user 201 with physical feedback related to game 135, such as notifying user 201 of the occurrence of an event in game 135. Activation of feedback element 293 may provide the back side user 201 with physical feedback by vibrating, tapping user 201 one or more times indicating the shot, or otherwise providing physical feedback to user 201.

In some implementations, physical feedback module 141 may introduce a time delay between a sequential activation of feedback element 291 and feedback element 293. For example, user 201 may experience a front side sensation due to activation of feedback element 291, e.g. a motion or vibration related to being shot. Then, after a time delay, feedback element 293 may be activated causing user 201 to experience a back side sensation, e.g. a motion or vibration related to being shot. By activating feedback element 291 on the front of user 201 before activating feedback element 293 on the back of user 201, system 100 may provide user 201 with a feeling of being shot, as if some object enters and leaves the body. In some implementations, feedback element 293 may produce an audio feedback, such as one or more localized sounds and/or a change in frequency of an audio feedback, e.g., a Doppler shift.

Figure 3:
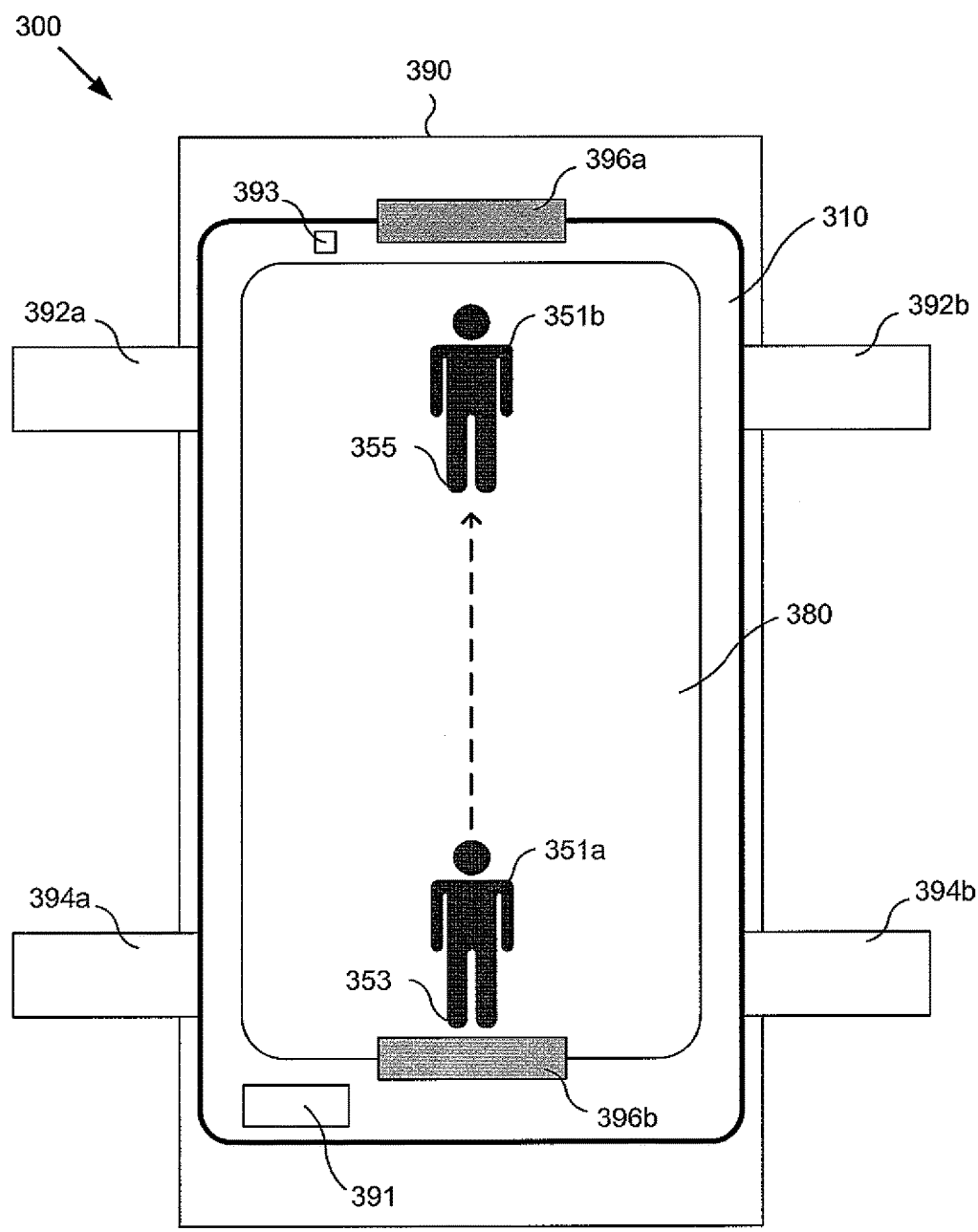
FIG. 3 shows a diagram of another exemplary feedback device, according to one implementation of the present disclosure.

FIG. 3 shows a diagram of another exemplary feedback device, according to one implementation of the present disclosure. Diagram 300 includes computing device 310, such as a mobile phone, connected to feedback device 390 using a holding mechanism, such as clips 396a and 396b, Velcro attachment or straps. As shown in FIG. 3, feedback device 310 includes straps which may be used to wear feedback device 310, e.g., on a user's forearm. A user may attach feedback device 390 to the user's forearm by placing feedback device 390 on the user's forearm and wrapping strap 392a and strap 392b around the user's forearm and connecting straps 392a and 392b on the side of the user's forearm opposite computing device 310. Straps 392a and 392b may be connected by tying the straps together, or using a Velcro attachment or a snapping attachment, etc. Straps 394a and 394b may be similarly wrapped around the user's forearm and connected to one another to secure feedback element 390 to the user's forearm. As shown in FIG. 3, computing device 310 includes display 380, feedback element 391, and feedback element 393.

Feedback device 390 may be used to create a sensation that character 351 is moving on the forearm of the user. During game play of game 135, visual feedback module 145, using display 380, may show character 351 in game 135 as moving from position 353 to position 355. As shown in FIG. 3, character 351a begins at position 353, moves across display 380, and is shown as character 351b in position 355. Physical feedback module 141 may activate feedback element 393 to cause feedback device 390 to vibrate. Physical feedback module 141 may cause feedback element 393 to vibrate periodically, such that each step of character 351 walking from position 353 to position 355 coincides with a vibration of feedback element 393. In some implementations, audio feedback module 143 may play an audio feedback. For example, audio feedback module 143, using feedback element 391, may play an audio that increases in frequency as character 351 moves from position 353 to position 355, or an audio that decreases in frequency as character 351 moves from position 353 to position 355. The movement of the character on display 380 combined with the audio feedback having a changing frequency may create the sensation that character 351 is moving along the forearm of the user. In other implementations, the combination of physical feedback and/or visual feedback and/or audio feedback may create the sensation that character 351 is moving along the forearm of the user.

Figure 4:
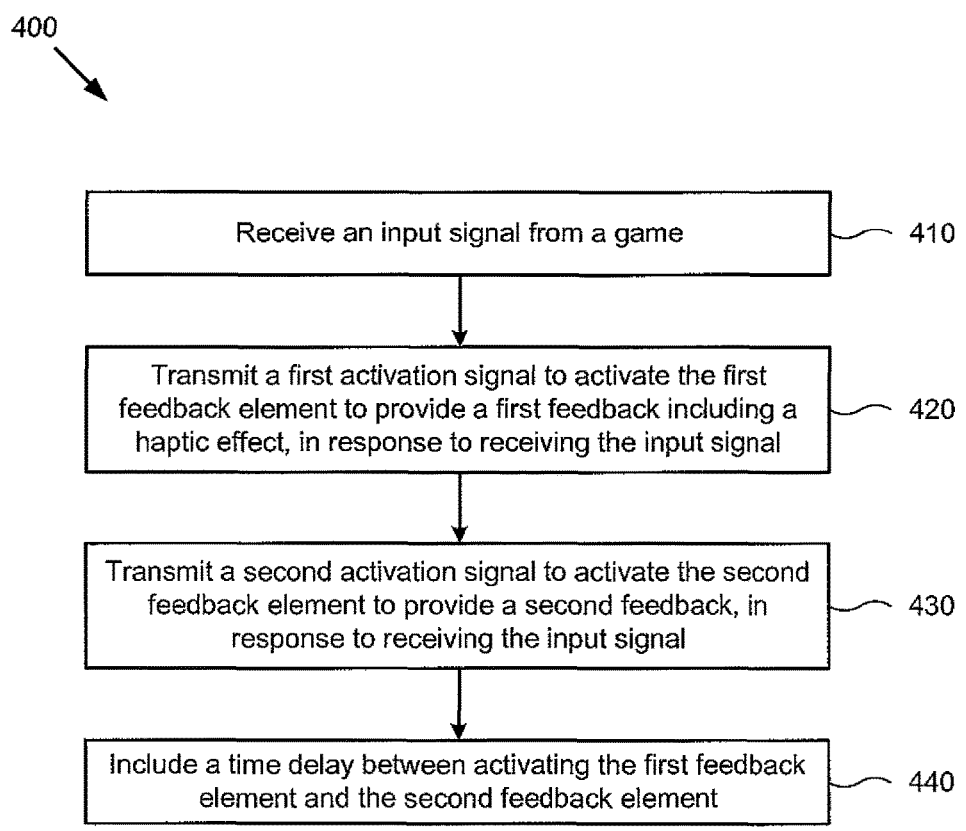
FIG. 4 shows a flowchart illustrating an exemplary method of providing immersive game feedback using haptic effects, according to one implementation of the present disclosure.

FIG. 4 shows a flowchart illustrating exemplary method 400 of providing immersive game feedback using haptic effects, according to one implementation of the present disclosure. Method 400 begins at 410, where executable code 140 receives an input signal from game 135. In some implementations, the input signal may be a user input, such as an input to progress game 135, and may result in a character moving in game 135. In other implementations, game 135 may be an interactive game, such as a first-person shooter game, and the input signal may be a result of an event occurring in game 135, such as a virtual enemy in the game shooting the character controlled by the user. In such an implementation, the user may see the virtual enemy on display 180 and see the shot fired by the virtual enemy. In response to the shot fired by the virtual enemy striking the character controlled by the user, game 135 may transmit the input signal to executable code 140.

At 420, executable code 140, using physical feedback module 141, transmits a first activation signal to activate feedback element 191 to provide a first feedback including a haptic effect, in response to receiving the input signal. In some implementations, activation of feedback element 191 may provide physical feedback to the user by activating a motor to cause a vibration, or activating a linear actuator to tap the user. For example, a user playing game 135 may wear feedback device 190, such as a vest including feedback element 191 located on the front of the vest. When the shot fired by the virtual enemy in game 135 strikes the character controlled by the user, feedback element 191 may be activated to vibrate on or near the front of the user's chest and/or tap the user's chest, providing physical feedback to the user that the character controlled by the user in game 135 has been shot. Physical feedback on the user's chest may create a sensation that the user has been struck in the chest by a shot in game 135.

At 430, executable code 140 transmits a second activation signal to activate feedback element 193 to provide a second feedback, in response to receiving the input signal. In some implementations, activation of feedback element 193 may provide physical feedback to the user by activating a motor to cause a vibration, or activating a linear actuator to tap the user. For example, a user playing game 135 may wear feedback device 190, such as a vest including feedback element 193 located on the back of the vest. When a character controlled by the user in game 135 is shot, feedback element 193 may be activated to vibrate on or near the back of the user's chest and/or tap the user's back, providing physical feedback to the user that the character controlled by the user in game 135 has been shot. Physical feedback on the user's back may create the sensation that the shot has exited the user's body through the back, simulating being shot.

In some implementations, feedback element 193 may include speaker 160. The speaker may be used to provide audio feedback, such as playing the sounds from game 135, e.g., the sound of the shot being fired, the sound of the shot impacting the user, the sound of the shot exiting the user, etc. In some implementations, audio feedback may be used to enhance the physical feedback. For example, audio feedback may enhance the user's experience of playing game 135 if the sounds were localized, such as the sound of the shot fired at the user's character being localized to appear to come from the direction of the character firing the shot, the sound of the shot impacting the user being localized in front of the user, and the sound of the shot exiting the user being localized behind the user. In other implementations, the speaker may be used to provide physical feedback. For example, the speaker may be located near the user's body and may be used to play a low frequency sound, causing the user to feel the sound. Such low frequency sound feedback may be used to create physical feedback such as an impact or to create a shaking effect, such as in an earthquake or an explosion.

Audio feedback may also be used to create the sensation of motion using changes in frequency. For example, an audio feedback used in combination with the user's character being shot may include a Doppler shift in the sound of the shot as it approaches the character and moves away from the character after the character is shot. In other implementations, a change in frequency of an audio feedback may be used in connection with a direction of a character walking in game 130. For example, the audio feedback may include an increasing frequency as a character appears to be walking up the arm of the user and a decreasing frequency when the character appears to be walking down the arm of the user. Additionally, the direction of motion combined with the changing frequency may create a sensation of motion.

In some implementations, feedback element 193 may include a display such as display 180. Display 180 may be used to provide visual feedback. In some implementations, display 180 may show a video content. The video content may depict events of game 135. In some implementations, display 180 may include an augmented reality display, enabling executable code 140 to provide visual feedback in the environment around the user. For example, augmented reality goggles may be used to display a character from game 135 walking on the arm of the user. In some implementations, the combination of the first feedback and the second feedback may provide a sensation of motion. For example, physical feedback providing a vibration on the arm of the user associated with the steps of a character walking, combined with a visual feedback of the character walking on the arm of user, may create the sensation that the character is walking on the user's arm, and that the character is moving on the user's arm.

At 440, executable code 140 includes a time delay between activating feedback element 191 and feedback element 193. Use of the time delay between activation of feedback element 191 and feedback element 193 may create a sensation of motion caused by the phi phenomenon. For example, when the character controlled by the user in game 135 is shot, physical feedback module 141 may activate feedback element 291 on the front of feedback vest 290, and, after a time delay, physical feedback module 141 may activate feedback element 293 on the back of feedback vest 290. The time delay may create a sensation that the shot that struck the user in game 135 passes through the user from front to back. In other implementations, a delay between a first physical feedback and a second physical feedback may create the sensation of motion by delaying the physical feedback to coincide with the steps of the character. In some implementations, the delay may be variable allowing executable code 140 to increase or decrease the frequency of the delay.

From the above description, it is manifest that various techniques can be used for implementing the concepts described in the present application without departing from the scope of those concepts. Moreover, while the concepts have been described with specific reference to certain implementations, a person having ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system comprising:
   a wearable feedback device including a first feedback element and a second feedback element, the wearable feedback device configured to be worn by a person, such that the first feedback element becomes located in a front side of the person and the second feedback element becomes located in a back side of the person;
   a non-transitory memory storing a game and an executable code;
   a hardware processor executing the executable code to:
      receive an input signal from the game;
      transmit a first activation signal to activate the first feedback element located in the front side of the person to provide a first feedback in response to receiving the input signal;
      introduce a time delay after transmitting the first activation signal to activate the first feedback element; and
      transmit, after the time delay, a second activation signal to activate the second feedback element located in the back side of the person to provide a second feedback, in response to receiving the input signal.

2. The system of claim 1, wherein the first feedback element is a first haptic actuator providing a first haptic effect and the second feedback element is one of a second haptic actuator providing a second haptic effect and a speaker.

3. The system of claim 1, wherein the first feedback element provides a first haptic effect and the second feedback element provides a second haptic effect.

4. The system of claim 1, wherein one of the first feedback element and the second feedback element provides a visual feedback on a display.

5. The system of claim 4, wherein the display is an augmented reality display.

6. The system of claim 1, wherein one of the first feedback element and the second feedback element is a component of a mobile phone.

7. The system of claim 1, wherein a combination of the first feedback and the second feedback provides a sensation of motion.

8. The system of claim 1, wherein the second feedback is playing an audio.

9. The system of claim 8, wherein the audio includes a Doppler shift.

10. The system of claim 1, wherein the game is a multi-player game.

11. A method for user with a system including a wearable feedback device, a non-transitory memory and a hardware processor, the wearable feedback device configured to be worn by a person, such that a first feedback element of the wearable feedback device becomes located in a front side of the person and a second feedback element of the wearable feedback device becomes located in a back side of the person, the method comprising:
   receiving, using the processor, an input signal from a game stored in the non-transitory memory;
   transmitting, using the hardware processor, a first activation signal to activate the first feedback element located in the front side of the person to provide a first feedback, in response to receiving the input signal;
   introducing, using the hardware processor, a time delay after transmitting the first activation signal to activate the first feedback element;
   transmitting, using the hardware processor and after the time delay, a second activation signal to activate the second feedback element located in the back side of the person to provide a second feedback, in response to receiving the input signal.

12. The method of claim 11, wherein the first feedback element is a first haptic actuator providing a first haptic effect and the second feedback element is one of a second haptic actuator providing a second haptic effect and a speaker.

13. The method of claim 11, wherein the first feedback element provides a first haptic effect and the second feedback element provides a second haptic effect.

14. The method of claim 11, wherein one of the first feedback element and the second feedback element provides a visual feedback on a display.

15. The method of claim 14, wherein the display is an augmented reality display.

16. The method of claim 11, wherein one of the first feedback element and the second feedback element is a component of a mobile phone.

17. The method of claim 11, wherein a combination of the first feedback and the second feedback provides a sensation of motion.

18. The method of claim 11, wherein the second feedback is playing an audio.

19. The method of claim 18, wherein the audio includes a Doppler shift.

20. The method of claim 11, wherein the game is a multi-player game.

* * * * *